US008972621B1

(12) United States Patent
Raza et al.

(10) Patent No.: US 8,972,621 B1
(45) Date of Patent: Mar. 3, 2015

(54) METHODS, SYSTEMS, AND PHYSICAL COMPUTER-READABLE MEDIA FOR MULTIPLEXING A SINGLE END-POINT MEMORY STRUCTURE BETWEEN USB INTERFACES

(75) Inventors: Syed Babar Raza, San Jose, CA (US); Sumeet Gupta, San Jose, CA (US); Pradeep Bajpai, San Jose, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 630 days.

(21) Appl. No.: 13/247,544

(22) Filed: Sep. 28, 2011

(51) Int. Cl.

*G06F 3/00* (2006.01)
*G06F 13/00* (2006.01)
*G06F 13/38* (2006.01)

(52) U.S. Cl.

CPC ...... *G06F 13/385* (2013.01); *G06F 2213/0042* (2013.01); *G06F 2213/4004* (2013.01)
USPC ................ 710/17; 710/18; 710/313; 710/316

(58) Field of Classification Search

CPC .......... G06F 13/385; G06F 2213/0042; G06F 2213/4004
USPC ..................................... 710/17, 18, 313, 316
See application file for complete search history.

(56) References Cited

U.S. PATENT DOCUMENTS 7,563,140 B1 7/2009 Wan et al.
7,837,499 B1 11/2010 Chen
7,921,233 B2 4/2011 Chung
7,946,887 B1 5/2011 Zhang et al.
8,099,534 B1 * 1/2012 Raza et al. ...................... 710/62
8,510,494 B2 * 8/2013 Pietri et al. .................... 710/313
8,533,380 B2 * 9/2013 Chang .......................... 710/313
2004/0019732 A1 * 1/2004 Overtoom et al. ........... 710/313
2006/0095642 A1 * 5/2006 Hesse et al. .................. 710/313
2006/0136683 A1 * 6/2006 Meyer et al. ................. 711/154
2009/0088024 A1 4/2009 Ling et al.
2010/0015855 A1 1/2010 Chang
2010/0161842 A1 * 6/2010 Shan et al. ..................... 710/18
2010/0174835 A1 7/2010 Chung
2010/0216327 A1 8/2010 Lin et al.
2011/0070751 A1 3/2011 Lee
2011/0119557 A1 5/2011 Chen et al.
2011/0179201 A1 * 7/2011 Monks et al. .................. 710/60
2012/0042178 A1 * 2/2012 Ishii et al. ..................... 713/300
2012/0084470 A1 * 4/2012 Antwerpen et al. ............ 710/63
2012/0084594 A1 * 4/2012 Chen et al. .................... 713/501

FOREIGN PATENT DOCUMENTS

WO 2009042771 A2 4/2009

* cited by examiner

*Primary Examiner* — Eric Oberly

(57) ABSTRACT

Several embodiments including methods, systems, and physical computer-readable storage media are configured to multiplex a single end-point memory (EPM) structure between a HS USB interface and a SS USB interface, which includes determining whether the SS USB interface is enabled, if the SS USB interface is enabled, detecting the SS USB interface, selecting the HS USB interface, if the SS USB interface is enabled, but not detected, and multiplexing between a functionality of a HS USB device interface and a functionality of a HS USB host interface, if the SS USB interface is not enabled.

20 Claims, 4 Drawing Sheets

METHODS, SYSTEMS, AND PHYSICAL COMPUTER-READABLE MEDIA FOR MULTIPLEXING A SINGLE END-POINT MEMORY STRUCTURE BETWEEN USB INTERFACES

TECHNICAL FIELD

This disclosure relates to the field of universal serial buses (USBs) and, in particular, to providing compatibility between USB interfaces.

BACKGROUND

The Universal Serial Bus (USB) standard provides a universal interface for a Personal Computer (PC) that includes universal plug-and-play and relative ease-of-use. Specifically, when a USB peripheral device is plugged-in to a USB port on a PC, the system will auto-detect and auto-configure the peripheral device. The USB peripheral devices may include devices such as printers, scanners, keyboards, a mouse, joysticks, digital cameras, digital video cameras, data acquisition devices, modems, speakers, telephones or video phones, storage devices such as ZIP drives, or any other peripheral or computing device. In most cases, there is zero user intervention. The USB interface also eliminates the need for multiple input/output (I/O) standards to peripheral devices, thereby simplifying PC connectivity for the consumer as well as simplifying manufacturing for the PC Original Equipment Manufacturers (OEMs).

The original USB specification has evolved over time to meet the needs of industry, resulting in three versions available today. The first two versions, USB 1.1 and USB 2.0, respectively, are wired interfaces, as they use a cable between a host (for example a personal computer or PC) and the USB peripheral device. Although the USB 1.1 has a top transmission speed of 12 million bits/second (Mb/s), system performance may become sluggish if multiple multimedia devices are attached to one USB 1.1 port. USB 2.0 transmission speed is increased to 480 mega bits/second but maintains backwards compatibility to the full speed (12 Mb/s) and low speed (1.5 Mb/s) devices defined in the USB 1.1 specification. USB 3.0 has transmission speeds of up to 5 gigabits/second and has downward compatibility to USB 2.0 devices.

Generally, each device or host that is USB 2.0 or USB 3.0 compatible includes a separate memory and/or memory controller to facilitate read/write requests from a system memory. Although such architecture is adequate, aspects of the system, such as die size and/or power consumption, may be improved.

BRIEF DESCRIPTION OF THE DRAWINGS

The present disclosure is illustrated by way of example, and not by way of limitation, in the figures of the accompanying drawings.

DETAILED DESCRIPTION

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

In the following detailed description, for purposes of explanation, numerous specific details are set forth in order to provide a thorough understanding of the subject matter of the present application. It will be evident, however, to one skilled in the art that the disclosed embodiments, the claimed subject matter and their equivalents may be practiced without these specific details.

The detailed description includes references to the accompanying drawings, which form a part of the detailed description. The drawings show illustrations in accordance with example embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. The following detailed description is not to be taken in a limiting sense as the scope of the subject matter to be patented is defined by the appended claims and their equivalents.

Methods, systems, and physical computer-readable media for multiplexing a single end-point storage structure between a High-Speed USB (HS USB) interface and a Super Speed USB (SS USB) interface are provided. In an embodiment, the method includes determining whether the SS USB interface is enabled, if the SS USB interface is enabled, detecting the SS USB device interface or the SS USB host interface, selecting the HS USB interface, if the SS USB interface is enabled, but not detected, and multiplexing between a functionality of the HS USB device interface and a functionality of the HS USB host interface, if the SS USB device interface is not enabled. In this way, a single mechanism (e.g., a single end point storage or memory (EPM) mechanism) is employed to multiplex data, the controls, and clocks of the HS USB device interface, HS USB host interface, SS USB device interface, and SS USB host interface.

Figure 1:
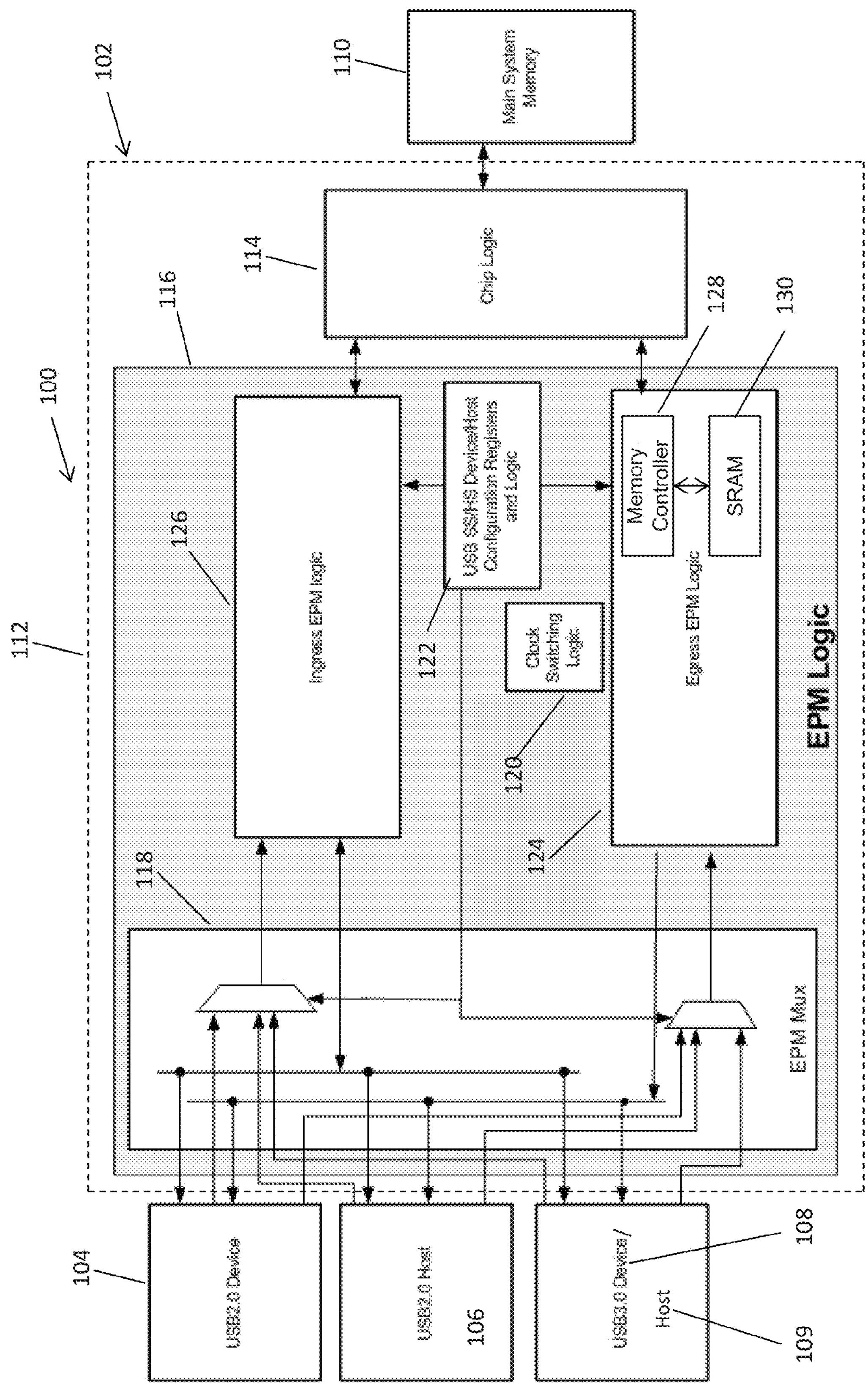
FIG. 1 is a block diagram of an end point memory (EPM) system architecture, according to an embodiment.

FIG. 1 is a block diagram of an end point storage system architecture 100, according to an embodiment. The end point storage system architecture 100 includes a controller 102 in communication with a USB 2.0 device interface 104, a USB 2.0 host interface 106, a USB 3.0 device interface 108, and a USB 3.0 host interface 109 (also referred to as USB interfaces 104, 106, 108, 109). Although USB 3.0 host and device interfaces 108, 109 are depicted as a single block, they may be two separate components. USB 2.0 devices and hosts are referred to as having "High Speed" (HS) capabilities and are thus, HS USB devices and hosts. USB 3.0 devices and hosts are referred to as "Super Speed" (SS) USB devices and hosts and have both HS and SS capabilities. Examples of components that can be employed as hosts include, but are not limited to personal computers (PC) tablets, Smart phones, LTE Modems. Examples of devices for use with the interfaces 104, 106, 108, 109 include, but are not limited to printers, scanners, keyboards, a mouse, joysticks, digital cameras, digital video cameras, data acquisition devices, modems, speakers, telephones or video phones, storage devices such as ZIP drives, or any other peripheral or computing device.

The controller 102 is configured to multiplex data, controls, and clocks of the USB interfaces 104, 106, 108, 109 and include a main system memory 110 and a controller 112. The main system memory 110 is configured to store firmware in the form of a computer readable medium containing instructions, main storage for data to and from other ports and or peripherals. In an embodiment, the main system memory 110 comprises single or multi-port RAM, and the like. The controller 112 is configured to perform controller-type tasks, in an embodiment. For example, the controller 112 can be configured to include chip logic 114 and end point memory (EPM) logic 116 as part of multiplexing between the USB interfaces 104, 106, 108, 109.

The chip logic 114 sends and receives data between the main system memory 110 and the EPM logic 116, in an embodiment. In an example, the chip logic 114 accesses data that may be stored in the main system memory 110 and analyzes various interrupt and status registers that may be generated by the EPM logic 116 and communicates the analyzed data to the main system memory 110.

The EPM logic 116 includes a multiplexer 118, clock switching logic 120, interoperability logic 122, egress EPM logic 124, and ingress EPM logic 126. The multiplexer 118 is disposed between the logic 120, 122, 124, 126 and the USB interfaces 104, 106, 108, 109. In an embodiment, the multiplexer 118 is configured to multiplex data control and clocks from the USB interfaces 104, 106, 108, 109. For example, the multiplexer 118 selects which USB interface 104, 106, 108, 109 to activate depending on the interoperability logic 122.

The clock switching logic 120 switches between a clock of the HS USB device interface and a clock of the SS USB device interface or between the clock of the HS USB device interface and of the HS USB host interface, in response to communication received by the multiplexer 118. In an embodiment, the clock switching logic 120 includes bit/s that selects between 120 MHz (e.g., for the HS USB device interface) and 125 MHz (e.g., for the SS USB device interface). In another embodiment, the clock switching logic 120 includes bit that selects between 120 MHz (e.g., for the HS USB device interface) and 120 MHz (e.g., for the HS USB host interface) and 125 MHz (e.g., for the SS USB host interface).

The interoperability logic 122 determines whether the SS USB interface 108 is enabled, in an embodiment. In another embodiment, the interoperability logic 122 also detects the SS USB interface 108.

The egress EPM logic 124 sends and receives data between the main system memory 110 and the multiplexer 118. In an embodiment, the egress EPM logic 124 is implemented by a memory controller 128 and local memory 130, both disposed between the main system memory 110 and the multiplexer 118. According to an embodiment, for new sets of data (e.g., data packets that have not been previously requested for retrieval) the memory controller 128 pulls data from the main system memory 110 and pushes the data to a selected USB interface 104, 106, 108, 109 and to the local memory 130 for new packets. In an embodiment, the local memory 130 can be a SRAM sized appropriately based on on the number of For example, it can 16K to support up to sixteen (16) egress end-points with a burst of up to 16. In another embodiment, such as for data packets previously requested for retrieval (i.e., retries), the data is pulled directly from the local memory 130 rather than from the main system memory 110. In this regard, the egress EPM logic 124 may be configured to support single packet retries for the end points of the HS USB device interface and HS USB host interface, and to support a retry of maximum allowed 16 packets (where each packet is 1K in size) for the SS USB device or host interface.

The ingress EPM logic 126 stores and forwards data into the main system memory 110. In an embodiment, the ingress EPM logic 126 is implemented by RAM. For example, a 2K dual port RAM may be employed to store and forward the data. In another embodiment, the data is pushed to the main system memory 110.

Figure 2:
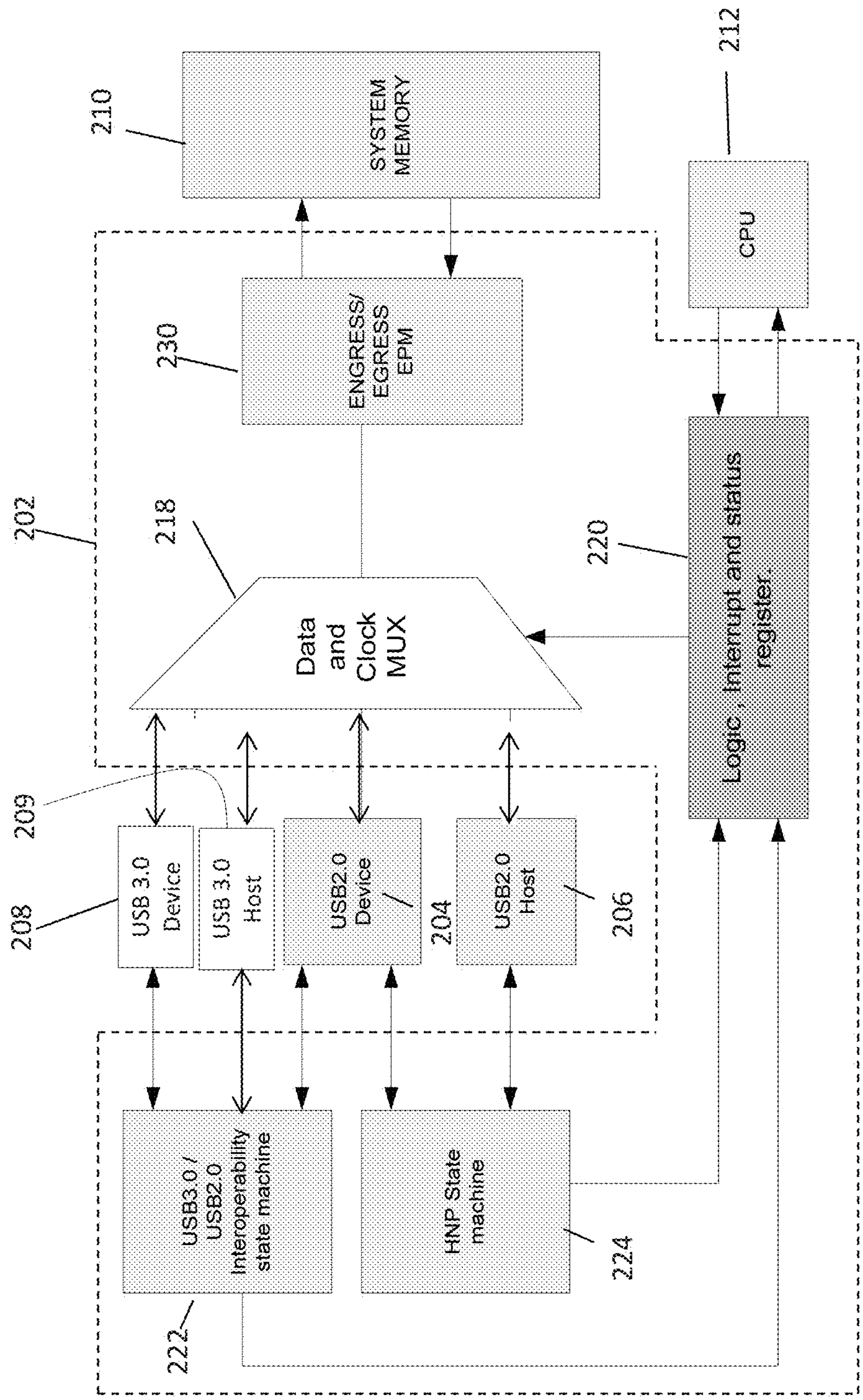
FIG. 2 is a block diagram of an EPM system, according to an embodiment.

FIG. 2 is a block diagram of an EPM system 200, according to an embodiment. The EPM system 200 includes EPM module 202, USB interfaces 204, 206, 208, 209, a main system memory 210, and a central processing unit 212. The EPM module 202 is disposed between the central processing unit (CPU) or controller 212, the USB interfaces 204, 206, 208, 209 and main system memory 210. The CPU 212 is configured similar to controller 112 of FIG. 1, the USB interfaces 204, 206, 208, 209 are configured similar to USB interface 104, 106, 108 of FIG. 1, and main system memory 210 is configured similar to main system memory 110 of FIG. 1.

In an embodiment, the EPM module 202 includes a multiplexer 218, a logic module 220, an interoperability state machine 222, a host negotiation protocol (HNP) state machine 224, and an ingress/egress EPM module 230. The multiplexer 218 is configured in a manner similar to multiplexer 118 of FIG. 1 and multiplexes the data, control, and clock of the USB interfaces 204, 206, 208, 209 based on commands received from the CPU 212. In particular, the multiplexer 218 may be configured to switch the data, control, and/or clock of the USB interfaces 204, 206, 208, 209, in accordance to commands from the CPU 212. The multiplexer 218 also sends and receives data stored in the main system memory 210 via the ingress/egress EPM module 230.

The logic module 220 is configured to serve as an interrupt and status register and receives data for the register from the interoperability state machine 222 and a host negotiation protocol (HNP) state machine 224 to allow the CPU 212 to determine commands to provide to the multiplexer 218. In an embodiment, the interoperability state machine 222 communicates with the SS USB device interface 208, SS host interface 209, and the HS USB device interface 204 to determine whether the SS USB interface is enabled. In particular, in an embodiment, the interoperability state machine 222 includes a configuration register that indicates whether a device connected to a USB port is requesting connection to a SS USB interface (e.g., SS device interface 208 or SS host interface 209), if a link partner to the SS USB interface is available. If the SS USB interface is enabled, the interoperability state machine 222 may also detect the SS USB device interface 208 or SS USB host interface 209, in an embodiment.

The host negotiation protocol (HNP) state machine 224 communicates with the HS USB device interface 206 and host interface 208. The HNP state machine 224 initiates an on-the-go (OTG) register to identify a HS USB device interface or host interface, in an embodiment. In another embodiment, the HNP state machine 224 provides a control register to connect or disconnect a HS USB D+ line, if the interoperability state machine 222 does not detect the SS USB interface as being enabled.

The ingress/egress module 230 stores, forwards, and accesses data of the main system memory 210. In an embodiment, the ingress/egress module 230 operates in a manner according to that described for ingress EPM logic 126 and egress EPM logic 124.

Figure 3A:
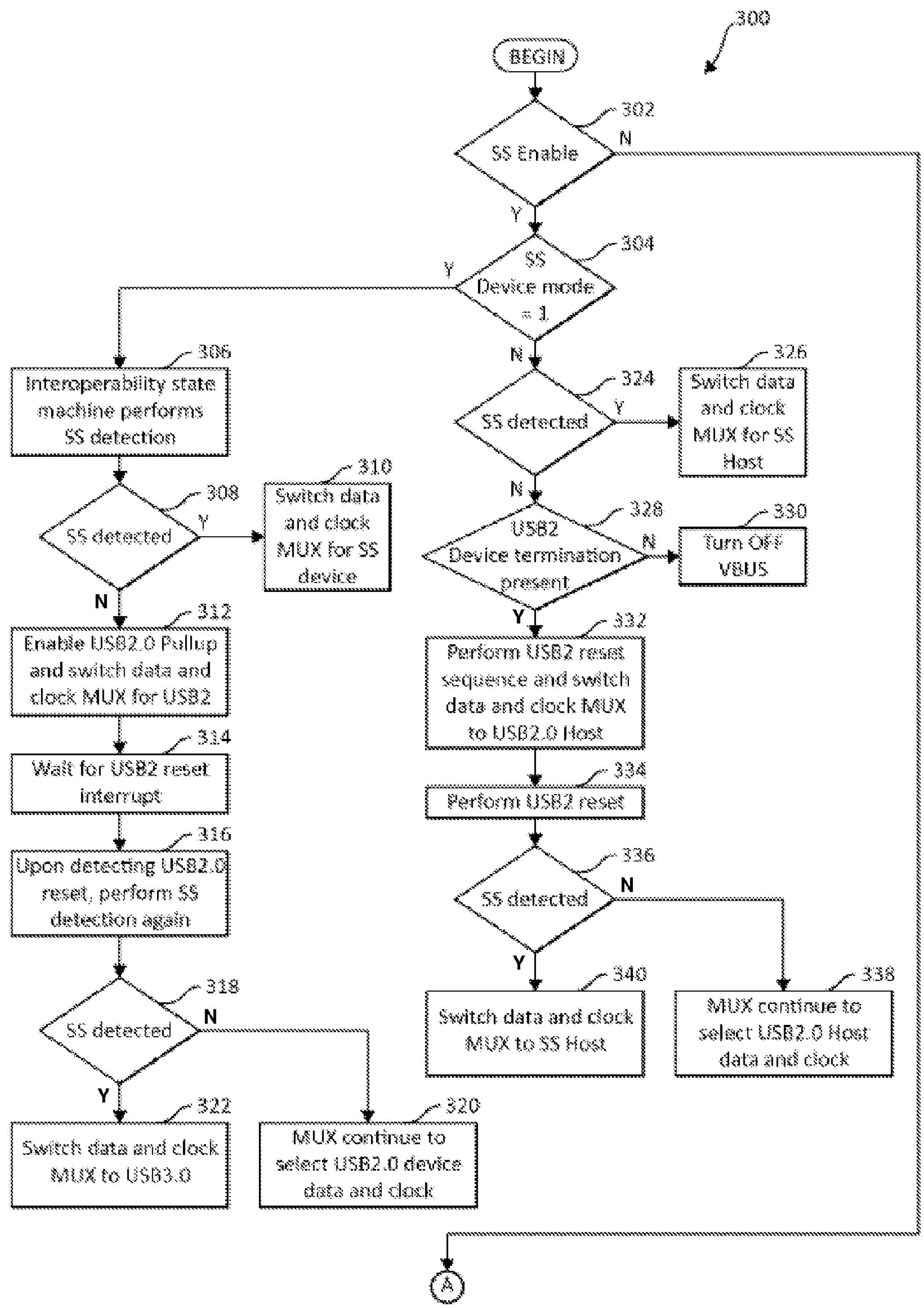
FIGS. 3A and 3B illustrate a flow diagram of a method of multiplexing a single end-point memory (EPM) structure between USB interfaces, according to an embodiment
Figure 3B:
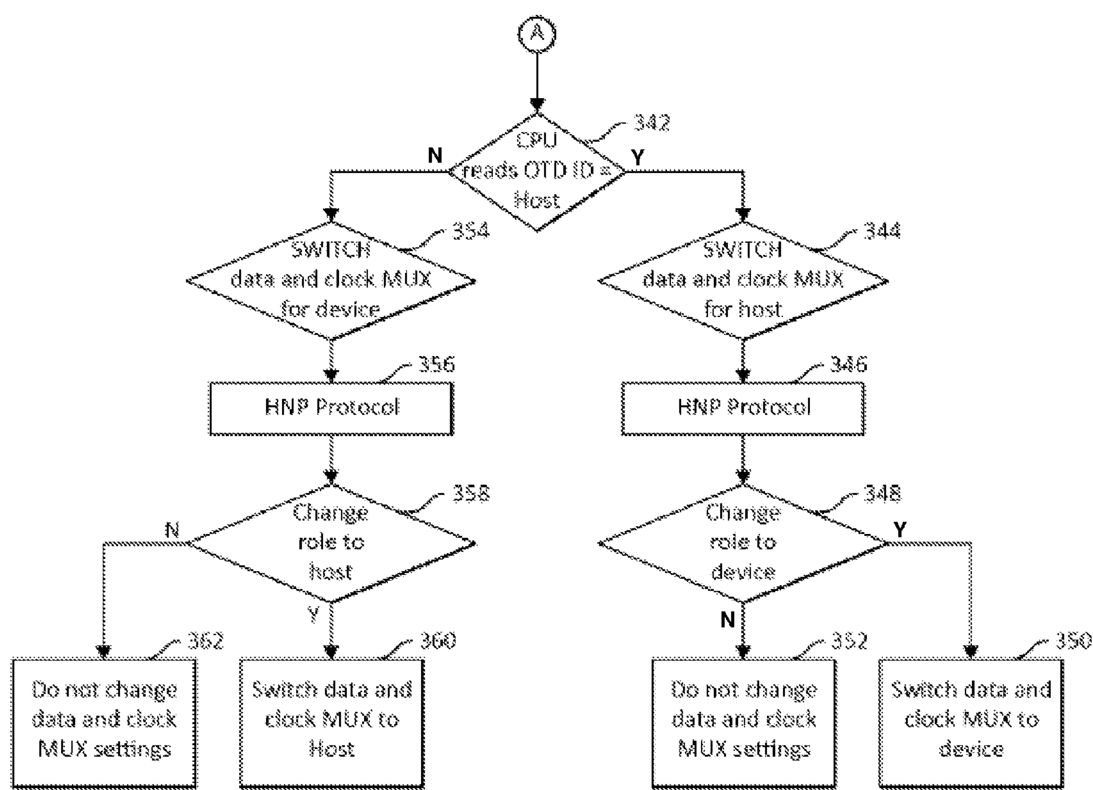

FIGS. 3A and 3B illustrate a flow diagram of a method 300 of multiplexing a single end-point storage (EPM) structure between a HS USB interface and a SS USB interface, according to an embodiment. At the start, a determination is made as to whether the SS USB interface is enabled, step 302. If the SS USB interface is enabled, the port assumes the role of a SS USB interface. Then, a determination is made as to whether the SS USB interface is in a device mode, step 304. If so, a detection of the SS USB interface is made, step 306. For example, an interoperability state logic (e.g., interoperability state machine 222) detects that the port is a SS USB interface and generates an event to a CPU (e.g., CPU 212). If the SS USB interface is detected, data and clock (i.e., "functionality") are switched to that of the SS USB interface, step 308. In an embodiment, the CPU examines the event provided in step 306 and then provides commands to the multiplexer to execute switch logic to handle SS USB device data packets, step 310. Additionally, the CPU provides commands to execute clock interoperability logic to the multiplexer to switch to a clock of the SS USB device, step 310. it can also be automatic.

At step 308, if the SS USB interface is not detected, then the HS USB interface is enabled, step 312. In an embodiment, the SS USB interface is not detected if the interoperability state machine cannot connect to the SS USB interface. In such case, a disconnect event ("interrupt") is generated and examined by the CPU. As a result, the CPU enables pull-up on a D+ line to establish a HS USB interface connection to allow switching to HS USB functionality. For example, the CPU also provides commands to the multiplexer to allow HS USB data packet transfers. In another example, the CPU provides commands to the multiplexer to execute clock interoperability logic to switch to a clock of the HS USB interface.

To insure that selection of the HS USB interface is valid, the method includes step 314 during which a HS USB interface reset interrupt may be detected. In an embodiment, the CPU generates an event upon HS USB interface detection. After detection, SS USB interface detection is repeated, step 316. For example, the CPU provides instructions to perform the SS USB interface detection. A determination is then made as to whether SS USB interface is detected, step 318. The interoperability state machine does not connect to the SS USB interface, if the SS USB is not detected and generates an event to the CPU. The CPU then provides commands to the multiplexer to select the HS USB interface data and clock, step 320. If the interoperability state machine does connect and the SS USB interface is detected, then the data and clock are switched to that of the SS USB interface, step 322. According to an embodiment, the CPU provides commands to the multiplexer to select the SS USB device interface data and clock. The CPU also disconnects the pull-up to the D+ line.

Returning to step 304, if the SS USB interface is not in a device mode, a determination is then made as to whether SS USB interface is detected, step 324. If so, the data and clock multiplexer is switched to that of the SS USB host interface, step 326. If the SS USB interface is not detected at step 324, a determination is made as to whether a HS USB device termination indicator is present, step 328. If not, the VBUS is turned off, step 330. If so, the method continues to step 332, where the HS USB reset sequence is performed and the data and clock multiplexers are switched to that of a HS USB host interface. The HS USB reset is performed, step 334.

A determination is then made as to whether SS USB interface is detected, step 336. The interoperability state machine does not connect to the SS USB interface, if the SS USB interface is not detected and generates an event to the CPU. The CPU then provides commands to the multiplexer to continue to select the HS USB host interface data and clock, step 338. If the interoperability state machine does connect and the SS USB interface is detected, then the data and clock are switched to that of the SS USB host interface, step 340. According to an embodiment, the CPU provides commands to the multiplexer to select the SS USB device interface data and clock. The CPU also disconnects the pull-up to the D+ line.

Returning to step 302, if the SS USB interface is not enabled, then a determination is made as to whether the HS USB device or HS USB host interface is to be employed, step 342. In an embodiment, the determination is made by the CPU, which analyzes an OTG ID value. The value may be an integer or other indicator to signify a device or a host. If the OTG ID value indicates a host, then the data and clock are switched to the HS USB host interface, step 344. For example, the CPU provides commands to the multiplexer to switch data and clock to that of the HS USB host interface.

Next, a host negotiation protocol (HNP) is examined, step 346. Examination is performed to insure that for the current communication the device is acting as a host or a device. A determination is then made as to whether to change a role of the host to that of a device, step 348. If the determination is made to change to the device, the data and clock may then switched to that of the HS USB device interface if needed, step 350. In particular, the multiplexer is provided with a command from the CPU to switch to handle data from the device port and the multiplexer is switched to supply the HS USB device clock. In an embodiment in which determination is made not to change the role of the host, the data and clock of the HS USB host is maintained, step 352.

If at step 342, the OTG ID value does not indicate a host, then the data and the clock of the system are switched to that of the HS USB device interface, step 354. For example, the CPU provides commands to the multiplexer to switch data and clock to that of the HS USB device interface.

Next, a host negotiation protocol (HNP) is examined, step 356. A determination is then made as to whether to change a role of the host to that of a device, step 358. If the determination is made to change to the host, the data and clock may then be switched to that of the HS USB host interface, step 360. In particular, the multiplexer is provided with a command from the CPU to switch to handle data from the host port and the multiplexer is switched to supply the HS USB host clock. In an embodiment in which determination is made not to change the role of the device, the data and clock of the HS USB device is maintained, step 362.

By including the logic module and operating the logic module according to the methods described above, a single memory can be used to share data transfer between HS USB devices, HS USB hosts, SS USB devices, and SS USB hosts. Additionally, the logic module provides a single, common interface logic to thereby provide a simplified design and smaller footprint (e.g., a single die) to the system. Moreover, a single endpoint memory support can be employed for all three USB interfaces (and hence, USB ports).

What is claimed is:

1. A method of multiplexing a single end-point storage structure between a High Speed (HS) USB device interface, a HS USB host interface, a Super Speed (SS) USB device interface, and a SS USB host interface, the method comprising:

determining whether a SS USB interface is enabled;

detecting the SS USB device interface or the SS USB host interface, if the SS USB interface is enabled;

selecting a HS USB interface, if the SS USB interface is enabled, but not detected; and multiplexing between a functionality of the HS USB device interface and a functionality of the HS USB host interface, if the SS USB interface is not enabled.

2. The method of claim 1, further comprising selecting the functionality of the SS USB interface, if the SS USB interface is detected.

3. The method of claim 1, further comprising detecting a reset of the HS USB interface after the step of selecting the HS USB interface.

4. The method of claim 3, further comprising repeating the step of detecting the SS USB device interface or the SS USB host interface after the step of detecting the reset.

5. The method of claim 1, wherein the step of multiplexing between the functionality of the HS USB host interface and the functionality of the HS USB device interface further comprises identifying whether a component is the HS USB host interface or the HS USB device interface.

6. The method of claim 5, wherein the step of multiplexing comprises switching to a clock of the HS USB device interface, if the HS USB device interface is identified.

7. The method of claim 5, wherein the step of multiplexing comprises providing a data packet transfer capability of the HS USB device interface, if the HS USB device interface is identified.

8. The method of claim 5, wherein the step of multiplexing comprises switching to a clock of the HS USB host interface, if the HS USB host interface is identified.

9. The method of claim 5, wherein the step of multiplexing further comprises providing a data packet transfer capability of the HS USB host interface, if the HS USB host interface is identified.

10. The method of claim 1, further comprising multiplexing between a data packet transfer capability of the SS USB device interface and a data packet transfer capability of the SS USB host interface, if the SS USB interface is enabled.

11. A system for multiplexing a single end-point storage structure between a HS USB device interface, a HS USB host interface, a SS USB device interface, and a SS USB host interface, the system comprising:

an end-point storage multiplexer configured to communicate with the HS USB device interface, the HS USB host interface, the SS USB device interface, and the SS USB host interface; and a controller configured to execute:

switch logic for switching between a functionality of a HS USB interface and a functionality of a SS USB interface, and device interoperability logic configured to determine whether the SS USB interface is enabled and to multiplex between the HS USB device interface and the HS USB host interface and the SS USB device interface and the SS USB host interface.

12. The system of claim 11, further comprising:

a main system memory in communication with the controller;

a plurality of USB buses in communication with the multiplexer;

a storage controller; and a local storage, wherein:

the storage controller is in communication with the main system memory, the multiplexer, and the local storage, the local storage is in communication with the multiplexer, and the controller is configured to dynamically determine whether to select the multiplexer to read data from the main system memory and to push the read data to one of the plurality of USB buses and the local storage, based, in part, on whether a first request for a first set of data is being made.

13. The system of claim 12, wherein:

the first set of data is stored in the local storage after the first request is made; and the controller is further configured to dynamically determine whether to select the multiplexer to read data from the local storage, based, in part, on whether a second request for the first set of data is being made.

14. The system of claim 11, wherein the controller is further configured to execute ingress End Point Memory (EPW logic for storing and forwarding incoming data into the main system memory.

15. The system of claim 14, further comprising a dual port implementing the ingress EPM storage logic.

16. The system of claim 11, further comprising clock interoperability logic for multiplexing between a clock of the HS USB interface and a clock of the SS USB interface.

17. The system of claim 16, wherein the controller is further configured to program the multiplexer after analyzing registers and interrupts generated by one of the device interoperability logic and the clock interoperability logic.

18. A non-transitory computer-readable storage medium having stored thereon instructions, for multiplexing a single end-point storage structure between a HS USB device interface, a HS USB host interface, a SS USB device interface, and a SS USB host interface when executed by a controller:

determines whether a SS USB interface is enabled;

detects the SS USB device interface or the SS USB host interface, if the SS USB interface is enabled;

selects a HS USB interface, if the SS USB interface is enabled, but not detected; and multiplexes between a functionality of the HS USB device interface and a functionality of the HS USB host interface, if the SS USB interface is not enabled.

19. The non-transitory computer-readable storage medium of claim 18, further comprising instructions that when executed selects the SS USB interface, if the SS USB interface is detected.

20. The non-transitory computer-readable storage medium of claim 18, further comprising instructions that when executed detects a reset of the HS USB interface after the step of selecting the HS USB interface.

* * * * *